United States Patent [19]

Danielssen et al.

[11] Patent Number: 4,931,098
[45] Date of Patent: Jun. 5, 1990

[54] METHOD FOR ADDING SILICA FUME TO DRY SHOTCRETE MIXTURE

[75] Inventors: Tore Danielssen, Kristiansand, Norway; Eike Herfurth, Allensbach, Fed. Rep. of Germany

[73] Assignee: Elkem a/s, Norway

[21] Appl. No.: 243,476

[22] Filed: Sep. 12, 1988

[30] Foreign Application Priority Data

Sep. 11, 1987 [NO] Norway ............................ 873789

[51] Int. Cl.⁵ ........................... C04B 7/02; B28C 5/06
[52] U.S. Cl. ........................... 106/638; 366/3; 106/737
[58] Field of Search ............... 106/98; 366/3

[56] References Cited

U.S. PATENT DOCUMENTS

| | | | |
|---|---|---|---|
| 2,392,408 | 1/1946 | Radonich | 366/3 |
| 4,494,990 | 1/1985 | Harris | 106/90 |
| 4,780,142 | 10/1988 | Rechter | 106/84 |
| 4,815,860 | 3/1989 | Deuse | 366/3 |

*Primary Examiner*—Brian E. Hearn
*Assistant Examiner*—Andrew Griffis
*Attorney, Agent, or Firm*—Lucas & Just

[57] ABSTRACT

A method for adding silica fume to a dry shotcrete mixture wherein the silica fume is added together with the water supplied to the dry mixture in the spray nozzle.

13 Claims, 2 Drawing Sheets

METHOD FOR ADDING SILICA FUME TO DRY SHOTCRETE MIXTURE

The present invention relates to a method for adding silica fume to dry shotcrete mixture.

BACKGROUND OF THE INVENTION

Shotcreting is a process for pneumatically projecting mortar or concrete at high velocity onto a surface or a structure.

In the dry shotcrete process all ingredients except water and sometimes liquid accelerators are mixed in the dry state and the mix is conveyed by an air stream through hoses or pipes to a spray nozzle where water is added and the mix including water is thrown towards the structure to be covered.

In the wet shotcrete process a ready mixed concrete including water is transported through hoses or pipes to a spray nozzle where compressed air is applied to throw the mix towards the structure to be covered.

One of the disadvantages in the shotcrete process is the very high rebound losses which are experienced. When using ordinary concrete mixtures, the rebound losses both for the dry and the wet shotcrete processes may exceed 40% by weight of the total amount of concrete sprayed onto a surface. Further, by using ordinary concrete mixtures the layer thickness in one pass is limited to about five cm and lower.

For the wet shotcrete process the above drawbacks have been partly overcome by adding silica fume to the concrete batch. The addition of silica fume to the concrete batch greatly enhances the cohesiveness of the concrete and thus the rebound losses are reduced to below 10% and it is possible to apply a layer of 20 cm and more in one pass on vertical surfaces.

In the wet shotcrete process the silica fume is added to the concrete batch before it is pumped through the hoses to the spray nozzle.

It is also known to use silica fume in the dry shotcrete process. This is done by mixing dry silica fume with the other dry ingredients, cement and sand, whereafter the dry mixture is transported by air stream to the nozzle where water is added.

The above mentioned silica fume consists of extremely fine, spherical silica particles containing approximately 90% by weight of $SiO_2$. The specific surface area is between 15 and 30 $m^2/g$ and the particles have a diameter between 0.1 and 0.2 $\mu m$.

This silica fume is obtained from the off-gases from electric furnaces for production of silicon or ferro-silicon. The silica fume can also be obtained by reduction of $SiO_2$ to SiO-gas and reoxidation of SiO in air.

Due to the very small particle size and the high surface area the silica fume causes problems when added to the dry mix in the dry shotcrete process. Firstly, a dusting problem arises when adding the dry silica fume to the cement and sand. Further, it is very difficult to obtain a proper wetting of the silica fume particles in the nozzle. It is therefore necessary to use a nozzle with two water rings. Thus the dry mix is prewetted by adding water through a first water ring before the final water amount is supplied through the second water ring in the nozzle. Even with this prewetting, the silica fume particles are not wetted to a satisfactory extent and when the cement mixture reaches the surface to which it is sprayed the mixture is inhomogeneous. Thus the rebound losses are much higher than for wet shotcrete containing silica fume, but they are about half of the rebound losses of ordinary dry shotcrete mixture.

SUMMARY OF THE INVENTION

It is an object of the present invention to provide a method for adding silica fume to the concrete mixture in dry shotcrete which makes it possible to overcome the above mentioned drawbacks and disadvantages of the known method of adding silica fume to dry shotcrete mixture.

Accordingly, the present invention relates to a method for adding silica fume to a dry shotcrete mixture wherein the silica fume is added together with the water supplied to the dry mixture in the spray nozzle.

Preferably, the silica fume is added to the water in the form of a slurry of water and silica fume which slurry has a content of less than 50% by weight of silica fume. According to a preferred embodiment of the present invention water entering the nozzle has a silica fume content between 5 and 30% by weight. For best result the water entering the spray nozzle contains between 10 and 25% by weight of silica fume.

By the method of the present invention the silica fume particles are already mixed with water when supplied to the dry shotcrete mixture. Thus there is no problem of wetting the silica fume particles. Further an extremely good mixing of the silica fume into the concrete is obtained. Thereby the rebound losses are reduced to between 5 to 10%. Further, an important increase of the strength of the shotcrete is achieved. The impermeability of the sprayed concrete is increased by a factor of at least 10.

According to the present invention silica fume can be added in at least two ways.

According to a preferred embodiment an aqueous slurry containing up to 50% silica fume is continuously fed to the water pipe in an amount necessary to obtain the desired amount of silica fume in the water pipe running to the nozzle. This embodiment has the major advantage that the amount of silica fume added to the shotcrete is not dependent on the amount of water added to the shotcrete. Thus if the flow of water to the nozzle is adjusted the amount of silica fume will remain the same as the amount of silica fume is only dependent on the flow of silica fume slurry to the water pipe.

According to another embodiment of the present invention a batch of silica fume slurry having the desired content of silica fume is prepared and fed into a tank before the shotcreting process is started and all water and silica fume are fed from this tank directly to the spray nozzle during the shotcreting process. In this embodiment of the process an adjustment of the water flow to the nozzle also implies an adjustment of the silica fume to the shotcrete.

The preferred amount of silica fume in the final shotcrete mix is between 5 and 25% by weight of the cement and preferably between 6 and 10% by weight of the cement.

It should be appreciated that course particles should be avoided in the silica fume as such particles would plug up the holes in the water ring in the nozzle. The holes in the water ring is normally between 0,6 and 2,5 mm. As mentioned above the diameter of the silica fume particles is between 0,1 and 0,2 $\mu m$ and the silica fume particles will therefore normally not block or plug up the holes in the water ring.

DESCRIPTION OF THE PREFERRED EMBODIMENTS

The present invention will now be further described with reference to the drawings.

Figure 1:
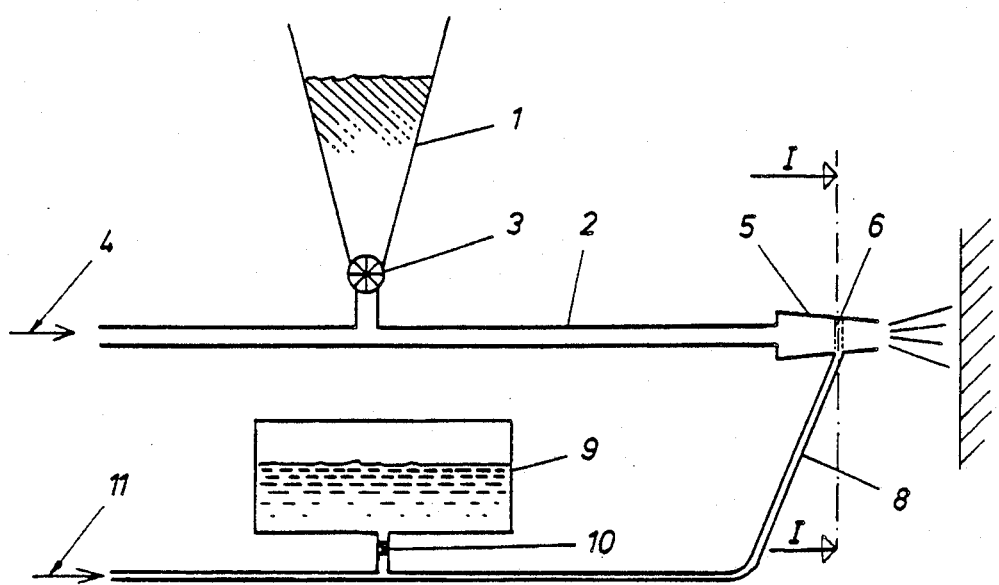
FIG. 1 shows a schematic view of the dry shotcrete method with addition of silica fume according to a first embodiment to the present invention.
Figure 2:
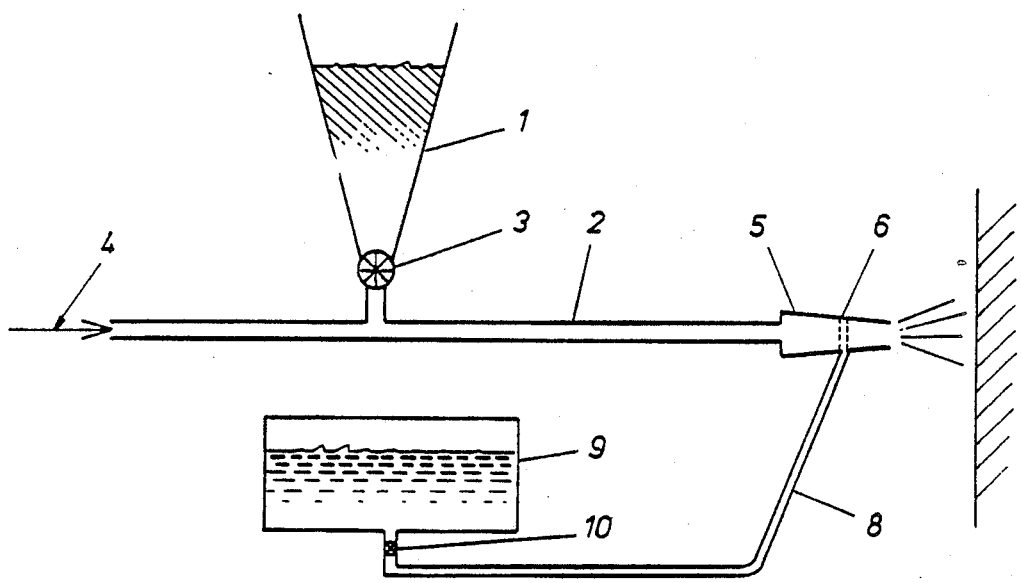
FIG. 2 shows a schematic view of the dry shotcrete method with addition of silica fume according to a second embodiment of the present invention and, FIG. 3 shows a cross-sectional view of the water-ring in an enlarged scale taken along line I—I of FIG. 1.
Figure 3:
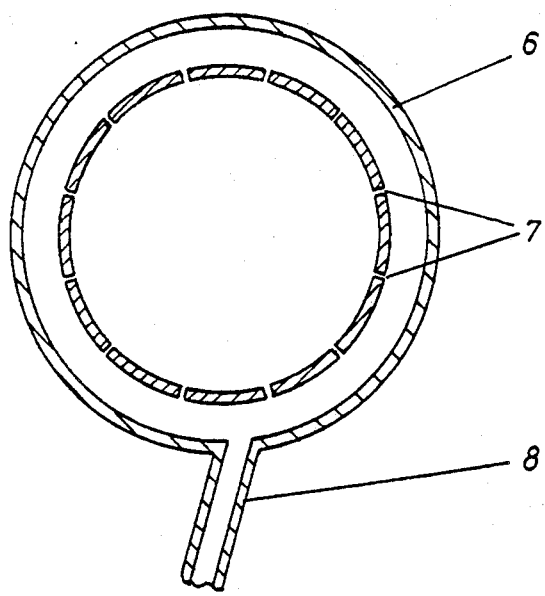

In FIGS. 1 and 2 a bin 1 for a premix of cement and sand is shown. The premix is charged from the bin 1 into a hose 2 at a predetermined rate by means of a discharge unit 3. The premix is transported through the hose 2 by means of compressed air 4 to the nozzle 5. The nozzle 5 is equipped with a water-ring 6 shown in FIG. 3. The water ring is equipped with openings 7 for spraying of a water curtain in front of the premix which is projected through the nozzle. Water is supplied to the water-ring through a pipe 8. The described equipment is convential equipment for dry shotcreting.

Now, by the method of the present invention a silica slurry having a silica content of 50% by weight or less is fed through the pipe 8 to the nozzle 5. In the embodiment shown on FIG. 1, the tank 9 is filled with a silica fume slurry containing ca. 50% silica fume and about 50% water. This silica fume slurry is a commercial product delivered by Elkem a/s under the trademark EMSAC. A preset amount of the EMSAC slurry in the tank 9 is continuously fed into the water pipe 8 in order to obtain a slurry of silica fume and water having the predermined content of silica fume. The water pipe 8 is connected to a water supply of normal industrial water supply 11. If the available industrial water pressure is too low, the water pressure can be increased by including a high water pressure pump. A valve 10 is arranged to regulate the flow of EMSAC slurry from the tank 9 to the pipe 8. An adjustment of the flow of water will not influence on the amount of silica fume added to the shotcrete.

In the embodiment shown in FIG. 2 a silica fume slurry having the desired content of silica fume is premixed in the tank 9 before the shotcreting process is started. In this embodiment of the present invention, all the water is supplied from the tank 9.

Curing accelerators, water-reducing agents etc. can be added to the silica fume slurry in order to obtain the necessary rheological properties of the shotcrete.

EXAMPLE

A full scale test was carried out in a mountain tunnel, using a dry mixture of 350 kg cement/m³ and sand with a particle size of 0-8 mm. The dry mix had a water content of about 3%. Silica fume slurry containing 33% by weight of silica fume and 67% of water was filled into the tank 9 of FIG. 2. This slurry was fed through the water ring 6 in the nozzle 5 to the dry mix in order to obtain a water/cement+silica fume ratio of about 0.40. The results showed that the rebound loss was reduced by a factor of about 4 compared to ordinary dry shotcrete without silica fume addition. The cohesiveness of the shotcrete was very good and a layer of 30 cm could easily be applied in one pass on the vertical tunnel wall.

We claim:

1. In the process of dry shotcreting wherein a dry cementitious composition is combined with water at a nozzle, the improvement comprising:

adding a silica fume composition to the water to form a first slurry of silica fume and water prior to combining the water and the dry cementitious composition; and combining said first slurry and dry cementitious composition at the nozzle.

2. The process of claim 1 wherein the silica fume composition is added to the water in the form of a second slurry of silica fume and water.

3. The process of claim 2 wherein the second slurry of silica fume contains silica fume up to about 50% by weight.

4. The process of claim 1 wherein the first slurry contains about 5% to about 30% by weight of silica fume.

5. The process of claim 2 wherein said second slurry of silica fume and water contains additives selected from the group consisting of curing accelerators and water-reducing agents.

6. A process for dry shotcreting comprising:
   (a) conveying through a first conveying means a dry cement composition to a nozzle;
   (b) transporting through a second conveying means a first aqueous slurry of silica fume to said nozzle;
   (c) combining at said nozzle said dry cement composition and said first aqueous slurry of silica fume to form a cementitious composition; and
   (d) projecting from said nozzle said cementitious composition against a surface.

7. The process of claim 6 wherein said first aqueous slurry of silica fume comprises about 5 to about 30% by weight silica fume.

8. The process of claim 6 wherein said first aqueous slurry of silica fume contains water-reducing agents.

9. The process of claim 6 further comprising the step of forming said first aqueous slurry of silica fume by adding a second aqueous slurry of silica fume to a stream of water in the second conveyor means.

10. The method of claim 9 wherein said second aqueous slurry of silica fume contains silica fume up to about 50% by weight.

11. The method of claim 10 wherein the second aqueous slurry of silica fume contains water-reducing agents.

12. The method of claim 10 wherein the second aqueous slurry contains curing accelerators.

13. The method of claim 10 wherein said first aqueous slurry of silica fume contains about 5 to about 30% by weight silica fume.

* * * * *